Patented Jan. 13, 1953

2,625,570

UNITED STATES PATENT OFFICE 2,625,570

CONVERSION OF POLYHYDRIC PHENOLS AND ETHERS OF POLYHYDRIC PHENOLS

Herman Pines, Chicago, and Jerome A. Vesely, Evanston, Ill., assignors to Universal Oil Products Company, Chicago, Ill., a corporation of Delaware No Drawing. Application August 26, 1950, Serial No. 181,683

17 Claims. (Cl. 260—621)

This invention relates to a process for converting polyhydric phenols and their ethers into compounds containing less oxygen and particularly to a process for producing monohydric phenols which are useful as dye intermediates, germicides, insecticides, oxidation inhibitors, and the like.

An object of this invention is to remove at least one hydroxyl group from a polyhydric phenol or an alkoxy polyhydric phenol.

Another object of this invention is to partially dehydroxylate a polyhydric phenol.

Still another object of this invention is to convert a polyhydric phenol into a monohydric phenol.

A further object of this invention is to convert guaiacol into cresol.

One embodiment of this invention relates to a process for converting a member of the group consisting of a polyhydric phenol and an ether of a polyhydric phenol into a compound containing less oxygen which comprises reacting a charging stock selected from the members of the group consisting of a polyhydric phenol and an ether of a polyhydric phenol with a hydrogen donor in the presence of an acid-acting, hydrogen-transfer catalyst to form a phenolic compound containing less oxygen than said charging stock and recovering said phenolic compound.

Another embodiment of this invention relates to a process which comprises reacting a polyhydric phenol with water at hydrogen transfer conditions in the presence of alumina activated by hydrogen fluoride to form a monohydric phenol, and recovering said monohydric phenol.

A further embodiment of this invention relates to a process which comprises reacting an ether of a polyhydric phenol and water at hydrogen transfer conditions in the presence of alumina activated by hydrogen fluoride to form a monohydric phenol, and recovering said monohydric phenol.

Dihydric phenols, other polyhydric phenols, and both mono-ethers and poly-ethers of dihydric and other polyhydric phenols are widely distributed in nature, chiefly in the form of glucosides in various plants. Thus orthodihydroxybenzene which is generally known as catechol or pyrocatechin occurs in many plants. This dihydroxybenzene has been obtained by the dry distillation of the tannins from various sources including catechin, kinotannic acid, and moringatannic acid and is also present in wood tar. Catechol is also formed by the oxidation of phenol with hydrogen peroxide. The monomethylether of orthodihydroxybenzene is known as guaiacol and is obtained from the creosote of beechwood tar, monomethylether being useful in medicine as an antiseptic.

The dimethylether of orthodihydroxybenzene which is known as veratrole may be prepared by the direct methylation of catechol, a method which is not suited to the preparation of the monomethylether because the methylation takes place so early that veratrole is the main product.

Metadihydroxybenzene which is commonly known as resorcinol is prepared in large quantities by the fusion of metabenzenedisulfonic acid with alkali at a temperature of 250° to 270° C.

Para-dihydroxybenzene is called hydroquinone. The glucoside of hydroquinone occurs in nature and is called arbutin.

3,5-dihydroxytoluene which is called orcinol is the most important of the six isomeric dihydroxyltoluenes. These substances occur in both the free and combined states in the lichens of the Lecanora and Rocella group. It may also be obtained by decarboxylation of orsellinic acid.

Eugenol and safrole are examples of derivatives of polyhydricphenols which occur in plants. These two compounds have the following structural formulae:

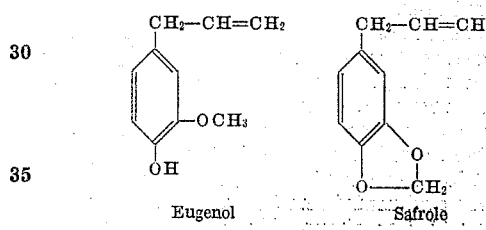

Eugenol    Safrole

Eugenol is present to the extent of about 90% in oil of cloves and in cinnamon leaf oil and is used on a large scale in perfumery, also as an antiseptic and as intermediates in the manufacture of vanillin. Safrole is present in the oils of sassafras and camphor trees. It is also used as a soap perfume and in the manufacture of helitropin.

Another dihydric phenol derivative is urushiol which is the chief constituent of japan lac, and has the following structure:

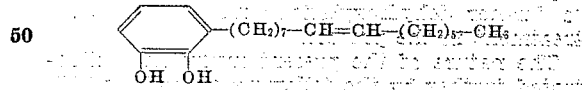

Trihydroxybenzenes are known mainly as pyrogallol or 1,2,3-trihydroxybenzene which may be prepared by the thermal decarboxylation of gallic acid. Phloroglucinol, 1,3,5-trihydroxybenzene, is obtained by fusion of many plant resins with alkali. Also 1,2,4-trihydroxybenzene may be obtained by the hydrolysis of its triacetate which is formed by the action of acetic anhydride on quinone in the presence of sulfuric acid.

The boiling points, melting points, and structures of some of the polyhydric phenols and ethers of polyhydric phenols are given in the following table:

*Table I*

SOME POLYHYDRIC PHENOLS

| Name | Structure | Boiling point, °C. | Melting point, °C. |
| --- | --- | --- | --- |
| Catechol | o-$C_6H_4(OH)_2$ | 245 | 105. |
| Resorcinol | m-$C_6H_4(OH)_2$ | 276.5 | 108. |
| Hydroquinone | p-$C_6H_4(OH)_2$ | 285 (730 mm.) | 170.3. |
| Orcinol | (1)$CH_3$-$C_6H_3(OH)_2(3,5)$ | 290 | 108 (anhyd.). |
| Pyrogallol | $C_6H_3(OH)_3(1,2,3)$ | 309 | 134. |
| Phloroglucinol | $C_6H_3(OH)_3(1,3,5)$ | Sublimes | 117. |
| 1,2,4-trihydroxybenzene | $C_6H_3(OH)_3(1,2,4)$ | | 140.5. |

SOME ETHERS OF POLYHYDRIC PHENOLS

| Name | Structure | Boiling point, °C. | Melting point, °C. |
| --- | --- | --- | --- |
| Guaiacol | $C_6H_4(OH)(OCH_3)$ | 205 | 28. |
| Veratrole | $C_6H_4(OCH_3)_2$ | 207 | 22. |
| Eugenol | $C_6H_3(C_3H_5)(OCH_3) \cdot OH$ | 253.5 | |
| Eugenol methyl ether | $C_3H_5 \cdot C_6H_3 = (OCH_3)_2$ | 248 | |
| Iso-eugenol | $C_6H_3(C_3H_5)(OCH_3) \cdot OH$ | 267.5 | |

Hydrogen transfer catalysts which are employed in this process include calcined composites of an oxygen acid of phosphorus and a siliceous carrier such as diatomaceous earth, also synthetically prepared composites of silica and alumina and of silica, alumina and zirconia, alumina activated by means of hydrogen fluoride, clays, acid-acting salts, and the like. The catalyst preferred for use in this process is formed by treating activated alumina with sufficient hydrofluoric acid so as to give a finished catalyst composite containing from about 0.1 to about 5% by weight of fluorine.

The process of this invention is carried out in either batch or continuous types of treatment at a temperature of from about 150° to about 500° C. and preferably at a temperature of from about 300° to about 500° C. The reaction is also carried out at a pressure of from atmospheric to about 100 atmospheres.

The process is carried out preferably in a continuous manner by passing the polyhydric phenol, ether of a polyhydric phenol or mixtures of a polyhydric phenol and its ether and a hydrogen donor such as water, an alcohol, a naphthenic hydrocarbon, etc. through a tubular reactor containing at least one acid-acting hydrogen transfer catalyst and maintained at a temperature of from about 150° to about 500° C. in order to effect partial dehydroxylation of polyhydric phenol and/or the removal of alkoxyl groups, for example, from an alkyl ether of a polyhydric phenol.

The reaction products obtained in either batch or continuous types of treatment are then separated from any catalyst that may be present therein and the resultant product is then subjected to suitable recovery treatment by isolating the phenolic compound of lower oxygen content than the charging stock from unconverted charging stock, the latter being suitable for recycling to further dehydroxylation and dealkoxylation treatment in the process.

The nature of the present invention is illustrated further by the following examples which are not included with the intention of unduly restricting the generally broad scope of the invention.

EXAMPLE I

A fraction of hardwood tar inhibitor oil (having an inhibitor ratio of 1 in gasoline) and water were passed at an hourly liquid space velocity of 0.6, through a catalyst reactor maintained at a temperature of 399° C. and containing 25 cc. of solid catalyst formed by treating activated alumina with hydrofluoric acid to give the catalyst a fluorine content of 1.5% by weight. The run was made for a time of 1.5 hours during which 31.8 grams of inhibitor oil and 24.3 grams of water were passed through the reactor. The reaction product was then washed, dried, and distilled, to yield 21.1 grams (73% of the inhibitor oil charged) of an inhibitor oil having an inhibitor ratio of 1.2 in gasoline.

EXAMPLE II

In a run similar to that referred to in Example I, a mixture of guaiacol and methanol (mole ratio of 1:2) was passed through 25 cc. of a silica-alumina hydrocarbon cracking catalyst at a temperature of 401° C. during a time of 2 hours using an hourly liquid space velocity of 0.8 on the guaiacol-methanol mixture. The higher boiling organic reaction products obtained weighed 37.6 grams or 91% of the weight of the guaiacol charged. This reaction product consisted of unconverted guaiacol and meta-cresol, the latter being formed in a yield of from 15 to 20% based upon the weight of guaiacol which reacted.

EXAMPLE III

In a run similar to that referred to in Example II, a mixture of two molecular proportions of methanol and one molecular proportion of guaiacol were passed over a solid phosphoric acid catalyst at a temperature of 225° C. during a time of 2.25 hours using a liquid hourly space velocity of 0.8. In this run, a small amount of the guaiacol was converted into meta-cresol and another portion of the charged guaiacol was converted into the dimethyl ether.

We claim as our invention:

1. A process for converting a member of the group consisting of a polyhydric phenol and an ether of a polyhydric phenol into a compound containing less oxygen which comprises reacting a charging stock selected from the members of the group consisting of a poly-hydric phenol and an ether of a polyhydric phenol with a hydrogen donor selected from the group consisting of water, an alcohol and a naphthenic hydrocarbon in the presence of an acid-acting, hydrogen-transfer catalyst and at hydrogen transfer conditions to form a phenolic compound containing less oxygen than said charging stock, and recovering said phenolic compound.

2. The process of claim 1 further characterized in that said catalyst comprises alumina activated by hydrogen fluoride.

3. The process of claim 1 further characterized in that said catalyst comprises silica and alumina.

4. The process of claim 1 further characterized in that said catalyst comprises a calcined composite of a phosphoric acid and a siliceous carrier.

5. A process which comprises reacting a polyhydric phenol with water at hydrogen transfer conditions in the presence of alumina activated by hydrogen fluoride to form a monohydric phenol, and recovering said monohydric phenol.

6. A process which comprises reacting an ether of a polyhydric phenol and water at hydrogen transfer conditions in the presence of alumina activated by hydrogen fluoride to form a monohydric phenol and recovering said monohydric phenol.

7. A process which comprises reacting a polyhydric phenol with a hydrogen donor selected from the group consisting of water, an alcohol and a naphthenic hydrocarbon at a temperature of from about 150° to about 500° C. in the presence of alumina activated by hydrogen fluoride to form a monohydric phenol, and recovering said monohydric phenol.

8. A process which comprises reacting a polyhydric phenol with water at a temperature of from about 150° to about 400° C. in the presence of alumina activated by hydrogen fluoride to form a monohydric phenol, and recovering said monohydric phenol.

9. A process which comprises reacting a polyhydric phenol with water at a temperature of from about 300° to about 400° C. in the presence of alumina activated by hydrogen fluoride to form a monohydric phenol, and recovering said monohydric phenol.

10. A process which comprises reacting a polyhydric phenol with water at a temperature of from about 300° to about 400° C. in the presence of alumina treated with hydrogen fluoride so as to have a fluorine content of from about 0.1 to about 5% by weight to form a monohydric phenol, and recovering said monohydric phenol.

11. A process which comprises reacting a polyhydric phenol with water at a temperature of from about 300° to about 500° C. in the presence of a catalyst consisting of a mixture of a synthetically prepared silica-alumina composite and alumina containing from about 0.1 to about 5% by weight of fluorine to form a monohydric phenol, and recovering said monohydric phenol.

12. A process which comprises reacting an ether of a polyhydric phenol with a hydrogen donor selected from the group consisting of water, an alcohol and a naphthenic hydrocarbon at a temperature of from about 300° to about 500° C. in the presence of alumina activated by hydrogen fluoride to form a monohydric phenol, and recovering said monohydric phenol.

13. A process which comprises reacting an ether of a polyhydric phenol with water at a temperature of from about 300° to about 500° C. in the presence of alumina activated by hydrogen fluoride to form a monohydric phenol, and recovering said monohydric phenol.

14. A process which comprises reacting an ether of a polyhydric phenol with water at a temperature of from about 300° to about 500° C. in the presence of alumina treated with hydrogen fluoride so as to have a fluorine content of from about 0.1 to about 5% by weight to form a monohydric phenol, and recovering said monohydric phenol.

15. A process which comprises reacting an ether of a polyhydric phenol with water at a temperature of from about 300° to about 500° C. in the presence of a catalyst consisting of a mixture of a synthetically prepared silica-alumina composite and alumina containing from about 0.1 to about 5% by weight of fluorine to form a monohydric phenol, and recovering said monohydric phenol.

16. A process which comprises reacting an ether of a polyhydric phenol with an alcohol at a temperature of from about 300° to about 500° C. in the presence of alumina treated with hydrogen fluoride so as to have a fluorine content of from about 0.1 to about 5% by weight to form a monohydric phenol and recovering said monohydric phenol.

17. A process which comprises reacting guaiacol and methanol at a temperature of from about 300° to about 500° C. in the presence of alumina treated with hydrofluoric acid so as to have a fluorine content of from about 0.1 to about 5% by weight to form cresol and recovering said cresol.

HERMAN PINES.
JEROME A. VESELY.

REFERENCES CITED

The following references are of record in the file of this patent:

UNITED STATES PATENTS

| Number | Name | Date |
| --- | --- | --- |
| 1,998,177 | Von Bramer et al. | Apr. 16, 1935 |
| 2,156,217 | Andrews et al. | Apr. 25, 1939 |
| 2,336,165 | Connolly | Dec. 7, 1943 |
| 2,551,737 | Haensel | May 8, 1951 |